(12) United States Patent
Yamamori et al.

(10) Patent No.: US 6,214,902 B1
(45) Date of Patent: *Apr. 10, 2001

(54) NONELUTION TYPE ANTIFOULING METHOD AND ANTIFOULING COATING COMPOSITION

(75) Inventors: Naoki Yamamori, Kyotanabe; Akio Harada, Okayama, both of (JP)

(73) Assignee: Nippon Paint Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,364

(22) Filed: Aug. 26, 1997

(30) Foreign Application Priority Data

Aug. 26, 1996 (JP) ........................................ 8-24453

(51) Int. Cl.$^7$ ........................................................ C08J 6/00
(52) U.S. Cl. ................................................................ 523/122
(58) Field of Search ............................ 523/122; 525/104, 525/100, 105, 63, 106

(56) References Cited

U.S. PATENT DOCUMENTS

| Re. 33,048 | * | 9/1989 | Kimmel et al. ........................ 523/122 |
| 3,879,491 | * | 4/1975 | Lindsey et al. ........................ 525/105 |
| 4,596,724 | | 6/1986 | Lane et al. ........................ 427/385.5 |
| 4,663,202 | | 5/1987 | Causton ........................ 427/388.4 |
| 4,789,692 | * | 12/1988 | Rei et al. ........................ 523/122 |
| 4,898,895 | * | 2/1990 | Masuoka et al. ........................ 523/122 |
| 5,116,611 | * | 5/1992 | Masuoka et al. ........................ 523/122 |
| 5,218,059 | * | 6/1993 | Kishihara et al. ........................ 525/477 |
| 5,298,060 | * | 3/1994 | Harakal et al. ........................ 523/122 |
| 5,514,731 | * | 5/1996 | Nakai ........................ 523/122 |
| 5,885,029 | * | 3/1999 | Kotani et al. ........................ 405/211 |

FOREIGN PATENT DOCUMENTS

| 329375 | * | 8/1989 | (EP) | ........................ 523/122 |
| 54-026826 | | 2/1979 | (JP) | ........................ C09D/5/14 |
| 63-57676 | * | 3/1988 | (JP) | ........................ 523/122 |
| 1-306479 | * | 12/1989 | (JP) | ........................ 523/122 |
| 3-255169 | * | 11/1991 | (JP) | ........................ 523/122 |
| 4-261474 | * | 9/1992 | (JP) | ........................ 523/122 |
| 8-037997 | | 2/1996 | (JP) | ........................ A01K/75/00 |

OTHER PUBLICATIONS

Encyclopedia of Polymer Science and Engineering, vol. 15, pp. 380–400, Wiley–Interscience Publication, 1989.*

* cited by examiner

Primary Examiner—Veronica P. Hoke
(74) Attorney, Agent, or Firm—Pollock, Vande Sande & Amernick

(57) ABSTRACT

The present invention provides a nonelution type antifouling method which comprises applying a nonelution type antifouling coating composition comprising at least two resins insoluble in seawater and incompatible with each other on top of the outermost layer of underwater portion of a marine structure and forming a coating film having a microheterogeneo us structure in which granular or disk-like minute protrusions with a mean size of 10 nm to 20 μm in diameter comprising at least one of said resins occupy 5 to 49% of the surface area of the coating film.

20 Claims, 5 Drawing Sheets

NONELUTION TYPE ANTIFOULING METHOD AND ANTIFOULING COATING COMPOSITION

FIELD OF THE INVENTION

The present invention relates to a nonelution type antifouling method, a method of forming a nonelution type antifouling coating, and a nonelution type antifouling coating composition.

BACKGROUND ART

Structures in contact with seawater, for example ships, oceanic constructions, fish farming nets, buoys and industrial water systems, are constantly exposed to water being inhabiting by various marine organisms. Therefore, with the lapse of time, microorganisms such as bacteria and diatoms and, further, fouling organisms of larger size, for example such animals and plants as barnacles, mussels and sea lettuce, adhere to said structures. When the surfaces of the structures in contact with seawater are covered with such marine organisms, there take place corrosion of the covered part, decreased marine fuel efficiency due to increased frictional resistance of the ship bottom against seawater, massive death of fishes and shellfishes due to clogging of fish farming nets, decreased working efficiency, and sinking of buoys due to reduced buoyancy.

To prevent these hazardous organisms from adhering, antifouling coatings have so far been applied. Typical of such antifouling coatings are antifouling coatings of the hydrolyzable type which contain a trialkyltin-containing polymer as an essential antifouling component. These antifouling coatings produce their effects when the trialkyltin-containing polymer is hydrolyzed in the weakly alkaline environment in seawater, whereby the organotin compound is elated and at the same time the coating vehicle becomes soluble in water, allowing elution of the antifoulant incorporated. However, the organotin compound eluted is highly toxic and harmful to the ecosystem. Ecofriendly antifouling means have therefore been required from the environmental pollution viewpoint.

Silicone rubber coatings are well known to be capable of producing an antifouling effect without elution of an antifoulant and/or some other component. The silicone rubber coatings have both water-repelling property and elasticity, together with other properties. These properties are utilized to produce the antifouling effect. However, such coatings are attacked by microorganisms at a very early phase following submersion thereof in seawater, with the result that they lose water-repelling property and allow rapid progress of adhesion of marine organisms.

Various proposals have been made to maintain water repellency and attain an improved lasting antifouling effect. Thus, for instance, Japanese Kokai Publication Sho-53-79980 discloses a method which comprises incorporating a silicon- and metal-free organic compound, such as liquid paraffin, into a vulcanized silicone rubber. Japanese Kokoku Publication Sho-56-26272 discloses a method which comprises incorporating a silicone oil with a molecular weight of about 2,000 to 30,000 into a silicone rubber. Japanese Kokoku Publication Sho-60-3433 discloses a method which comprises adding a petroleum fraction-derived substance with a low critical surface tension, such as vaseline, to a silicone rubber. Japanese Kokai Publication Sho-54-26826 and Japanese Kokoku Publication Sho-57-16868 disclose a method which comprises incorporating various thermoplastic resins or a polyvinylbutyral resin into a silicone rubber. However, by these technologies, it is difficult to maintain the antifouling effect over a long period of time.

Japanese Kokai Publication Hei-07-328523 discloses a water-repelling coating film which comprises a resin coating and minute particles at least the surface of which is hydrophobic and which have a mean size of 1 nm to 1 mm and are fixed on at least 20% of the coating surface area. However, this technology still has a problem. Since the minute particles are caused to adhere to the resin in the step of coating formation when the resin is in the uncured or semicured state, the coating film, when used in water for a long period, allows the minute particles to come off from the coating, whereby the water repellency of the coating film is impaired.

Japanese Kokai Publication Hei-08-195126 discloses a technology for preventing the icing by a water-repellent coating film which has a minute unevenness on the surface and is coated on tops of the protrusions with a film formed by a water-repellent material. The coating film according to this technology has the protrusions with a height of 0.03 to 250 $\mu$m at intervals of 0.1 to 50 $\mu$m. Since this coating film, however, is formed by subjecting minute particles comprising, for example, an inorganic oxide to adhesion to the surface of coating layer using a means such as application and spraying, the coating film, when used for a long period, tends to allow the minute particles to come off from the coating, whereby the water repellency of the coating film is impaired. Moreover, since the unevenness is formed by subjecting the minute particles to application or spraying to the surface of coating layer, it is difficult to obtain a desired unevenness and a coating film having the minute protrusions with a desired size in a desired proportion to the surface area.

Japanese Kokai Publication Hei-08-26177 discloses a method of forming a surface decreasing a frictional resistance in water, which comprises mixing a specific powder with a resin and applying the resulting mixture to a surface of a structure to be coated. The surface of the structure to be coated according to this technology has the unevenness formed by the powder, the protrusions with a height of 0.09 to 90 $\mu$m being at intervals of 0.1 to 30 $\mu$m. Since this coating film, however, is formed by subjecting minute particles comprising, for example, an inorganic oxide to adhesion to the surface of coating layer using a means such as application and spraying, the coating film, when used in water for a long period, tends to allow the minute particles to come off from the coating, whereby the water repellency of the coating film is impaired. Moreover, since the unevenness is formed by subjecting the minute particles to application or spraying to the surface of coating layer, it is difficult to obtain a desired unevenness and a coating film having the minute protrusions with a desired size in a desired proportion to the surface area.

Furthermore, none of the technologies mentioned above have a suggestion nor a confirmation that the coating films can attain antifouling performances in water for a long period. Moreover, since the technologies needs a step of subjecting minute particles to adhesion, the formation of coating films is complicated and poor in practicality.

Accordingly, it is an object of the present invention to provide a nonelution type antifouling method by which the antifouling effect can be maintained for a prolonged period of time without adversely affecting the environment, a method of forming a nonelution type antifouling coating, and a nonelution type antifouling coating composition suited for said method.

SUMMARY OF THE INVENTION

As a result of intensive investigations made to solve the problems mentioned above while directing their attention to the state of the coating surface in contact with seawater, the present inventors found that when, on the coating surface formed from an antifouling coating composition, granular or disk-like minute protrusions with a mean size of 10 nm to 20 µm in diameter are formed by at least one of the resins insoluble in seawater contained in said antifouling coating composition and when 5 to 49% of the surface area of the coating is occupied by said protrusions, an antifouling effect can be produced without elution of any antifouling component.

Based on this and other findings, the present invention has now been completed.

Thus, the gist of the present invention consists in a nonelution type antifouling method which comprises applying a nonelution type antifouling coating composition comprising at least two resins insoluble in seawater and incompatible with each other on top of the outermost layer of underwater portion of a marine structure and forming a coating film having a microheterogeneous structure in which granular or disk-like minute protrusions with a mean size of 10 nm to 20 µm in diameter comprising at least one of said resins occupy 5 to 49% of the surface area of the coating film.

In another aspect, the gist of the present invention consists in a nonelution type antifouling coating composition for use in carrying out the nonelution type antifouling method which comprises at least two resins insoluble in seawater and incompatible with each other, wherein said resins are occurring in a form dissolved or suspended in a solvent and, after application of the coating composition, are capable of forming a coating film having a microheterogeneous structure in which granular or disk-like minute protrusions formed in situ on the substrate with a mean size of 10 nm to 20 µm in diameter occupy 5 to 49% of the surface area of said coating film.

In a further aspect, the gist of the present invention consists in a method of forming a nonelution type antifouling coating, which comprises applying a nonelution type antifouling coating composition comprising at least two resins insoluble in seawater and incompatible with each other, the resins occurring in a form dissolved or suspended in a solvent, on a structure to be coated, and coating a part or the whole part of said structure with said composition to thereby form a coating film having a microheterogeneous structure with granular or disk-like minute protrusions formed in situ on the substrate with a mean size of 10 nm to 20 µm in diameter comprising at least one of said resins.

In a further aspect, the gist of the present invention consists in a coating film having a microheterogeneous structure which is produced by a method comprising applying the nonelution type antifouling coating composition to a structure to be coated so that 5 to 49% of the surface area of the coating film is occupied by granular or disk-like minute protrusions formed in situ on the substrate with a mean size of 10 nm to 20 µm in diameters

BRIEF DESCRIPTION OF THE PHOTOGRAPHS

DETAILED DESCRIPTION OF THE INVENTION

Figure 1:
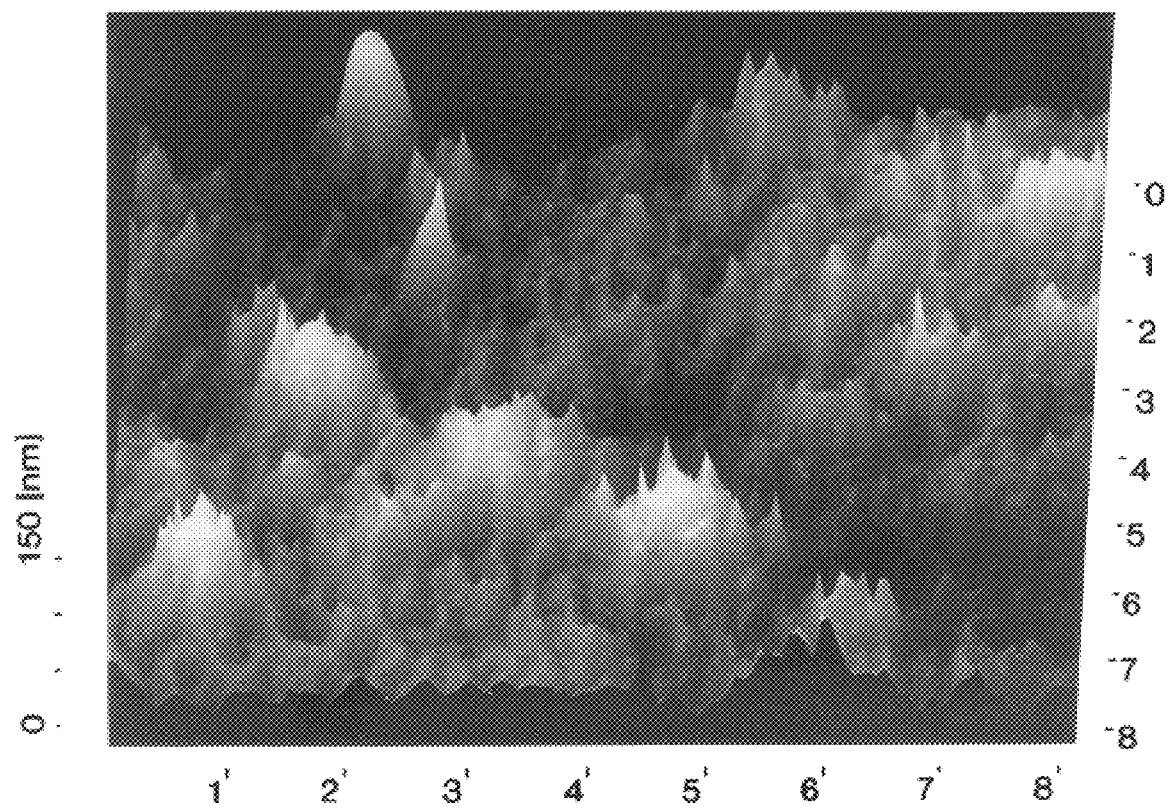
FIG. 1 is an interatomic force photomicrograph showing the coating surface obtained from the antifouling coating composition of Example 1.

According to the nonelution type antifouling method of the present invention, a nonelution type antifouling coating composition comprising at least two resins insoluble in seawater and incompatible with each other is applied on top of the outermost layer of underwater portion of a marine structure to form a coating film.

Said structure is not limited to any particular one but includes, among others, ship bottoms, fish farming nets, stationary nets, buoys as well as cooling water systems in factories, thermal power plants, nuclear power plants etc.

The nonelution type antifouling coating composition to be applied on top of the outermost layer of underwater portion of a marine structure comprises at least two resins insoluble in seawater and incompatible with each other. As said resins insoluble in seawater, there may be mentioned two groups shown below. At least one species may be selected from each group. The first group includes reaction-setting resins such as polybutadiene rubbers, one-pack setting silicone rubbers, one-pack setting epoxy resins and urethane elastomers and dry-setting resins. The second group includes dry-setting resins such as acrylic resins, styrene resins, vinyl chloride resins, polyoxyethylene-silicone block resins and silicone-grafted acrylic resins.

The above-mentioned resin insoluble in seawater is preferably an organic polymeric resin occurring in a form dissolved or suspended in a solvent.

In accordance with the present invention, a coating film having a microheterogeneous structure with granular or disk-like minute protrusions can be formed in situ on top of the outermost layer of underwater portion of a marine structure by combinedly using at least two resins incompatible with each other as selected from among the above-mentioned resins insoluble in seawater without the neccesity of using granular or particulate component.

The term "coating film having a microheterogeneous structure" as used herein means a coating, when formed from a mixture of two or more resins having contrastive properties, macroscopically showing no separation into the respective resins but microscopically showing micro-domains at random formed on the surface by molecules of the same kind gathering together, namely a coating forming the so-called sea-island structure with the major component forming the continuous phase and the minor component forming the dispersed phase.

In the present invention, the coating film having a microheterogeneous structure with granular or disk-like minute protrusions can be formed in the case the nonelution type antifouling coating composition contains no particulate component.

Said granular or disk-like minute protrusions have a mean size of 10 nm to 20 µm in diameter. When said size is less than 10 nm, granular or disk-like protrusions cannot be formed as desired, with the result that only an unsatisfactory surface microheterogeneous structure is formed. When said size is greater than 20 µm in diameter, the protrusions are excessively great, so that they may serve as footholds for marine organisms. The above range is thus critical.

According to the nonelution type antifouling method of the present invention, the nonelution type antifouling coating composition comprising at least two resins insoluble in seawater and incompatible with each other is applied on top of the outermost layer of underwater portion of a marine structure to form a coating film having a microheterogeneous structure in which granular or disk-like minute protrusions with a mean size of 10 nm to 20 μm in diameter occupy 5 to 49% of the surface area of the coating film.

Said granular or disk-like minute protrusions with a mean size of 10 nm to 20 μm in diameter occupy 5 to 49% of the total surface area of the coating film. When the coverage is less than 5%, the surface microheterogeneous structure will be insufficient, hence any satisfactory antifouling effect will not be obtained. When the coverage is above 49%, the protrusions occupy an excessively large area, so that they may serve as footholds for the adhesion of marine organisms. The above range is thus critical and a range of 5 to 35% is preferred.

The nonelution type antifouling method of the present invention is carried out by covering with the above-mentioned coating film having granular or disk-like minute protrusions with a mean size of 10 nm to 20 μm in diameter. By rendering, in this manner, the surface, which is the seawater-contacting surface, of said coating film microheterogeneous in structure, marine organisms can be prevented from adhering, among others. According to the nonelution type antifouling method of the present invention, said coating film is macroscopically uniform and will not undergo changes in seawater but can maintain the structure thereof at the time of coating, with the result that an antifouling effect can be stably obtained for a long period of time.

The nonelution type antifouling coating composition of the present invention comprises at least two resins insoluble in seawater and incompatible with each other, wherein said resins are occurring in a form dissolved or suspended in a solvent and, after application of the coating composition, are capable of forming a coating film having a microheterogeneous structure in which granular or disk-like minute protrusions formed in situe on the substrate with a mean size of 10 nm to 20 μm in diameter occupy 5 to 49% of the surface area of said coating film.

The above-mentioned nonelution type antifouling coating composition is preferably capable of forming the coating film at ordinary temperature.

The nonelution type antifouling coating composition of the present invention comprises at least two resins insoluble in seawater and incompatible with each other. Said resins insoluble in seawater are not limited to any particular species but include, for example, those mentioned hereinabove in relation to the nonelution type antifouling method. In the practice of the present invention, said resins respectively have a solubility parameter (SP) value of less than 12.5 $[cal/cm^3]^{1/2}$. SP values higher than 12.5 $[cal/cm^3]^{1/2}$ are inadequate since marked swelling or dissolution occurs in seawater. The SP value can be determined by the so-called solvent spectrometric method.

More specifically, for example, an appropriate amount of a solvent is added to 1 to 2 g of a resin and whether the resin is soluble in the solvent added is checked. The solvent may be any solvent that constitutes a solvent spectrum with the SP value increasing irrespective of chemical structure, and can suitably be selected. As said solvent spectrum-constituting solvent, there may be mentioned, for example, those described in Table 2.1 on page 523 of POLYMER HANDBOOK VII (edited by J. Brandrup and E. H. Immergut, John Wiley & Sons, 1989). The median of the SP value range for those, among the above-mentioned solvents, in which the resin is soluble is taken as the SP value of said resin.

Among the above-mentioned resins insoluble in seawater, dry-setting resins capable of forming a film upon volatilization of the solvent such as acrylic resins, styrene resins, vinyl chloride resins, polyoxyethylene-silicone block resins and silicone-grafted acrylic resins are preferred as a resin for forming granular or disk-like minute protrusions with a mean size of 10 nm to 20 μm in diameter. In the practice of the present invention, silicone-grafted acrylic resins are most preferred.

Among said resins insoluble in seawater, reaction-setting resins and dry-setting resins such as polybutadiene rubbers, one-pack type silicone rubbers, one-pack type epoxy resins and urethane elastomers are preferred as a resin other than the resin for forming granular or disk-like minute protrusions with a mean size of 10 nm to 20 μm in diameter.

In the practice of the present invention, the SP value determination for the above reaction-setting resins is carried out using the resins before reaction, since the measurement is impossible after reaction.

The resin for forming granular or disk-like minute protrusions is incorporated preferably in an amount of less than 50% by weight. Amounts exceeding 50% by weight lead to failure to form granular or disk-like minute protrusions and offer the problem of reduced film strength. The lower limit is not critical provided that said granular or disk-like minute protrusions can be formed. Preferably, however, said lower limit is set at 3% by weight although it may depend on the specific gravity of the resin employed.

Said resin for forming granular or disk-like minute protrusions and the resin other than the resin for forming granular or disk-like minute protrusions preferably differ in solubility parameter (SP) value by 0.3 to 4 $[cal/cm^3]^{1/2}$.

When the difference in SP value is less than 0.3 $[cal/cm^3]^{1/2}$, the resins are compatible with each other, failing to give a microscopically heterogeneous structure to the coating film but giving a uniform and smooth coating, hence marine organisms tend to adhere easily. On the other hand, when said difference exceeds 4 $[cal/cm^3]^{1/2}$, almost no interaction takes place between the two resins and therefore the resins remain in a state completely separated from each other, leading to phase separation. Said phase separation means a state in which the film formed from a mixture of two or more resins having contrastive properties shows repeated portions which result from aggregation, owing to molecular motions, of resin molecules similar in properties and are respectively similar to those resulting from film formation using the respective resins singly. In this state, the coating strength is weak at boundaries between the respective resins and therefore the form and strength required for the structure-coating film after forming cannot be maintained.

The difference in specific gravity between said resin for forming granular or disk-like minute protrusions and the resin other than the resin for forming granular or disk-like minute protrusions is preferably not more than 0.3. When said difference exceeds 0.3, phase separation into the upper and lower layers occurs in coating formation, leading to failure to form granular or disk-like minute protrusions with a mean size of 10 nm to 20 μm in diameter.

The nonelution type antifouling coating composition of the present invention is preferably such that the thickness of the coating obtained is at least three times the mean size of the granular or disk-like minute protrusions formed on the coating surface. Even when the film thickness is less than three times the mean size of the granular or disk-like minute protrusions, a coating having a microheterogeneous structure can be obtained but, when the film thickness is too thin, it is difficult to maintain said granular or disk-like minute protrusions in seawater for a long period of time. More specifically, said film thickness is preferably not less than 50 μm.

To the nonelution type antifouling coating composition of the present invention, there may be added, for improving the antifouling performance, one or more ingredients selected from among known antifoulants, biocides, algicides, water repellency agents such as silicone oils, paraffin and vaseline, and so forth, each in an amount incapable of preventing the formation of said granular or disk-like minute protrusions.

The coating film having a microheterogeneous structure in which granular or disk-like minute protrusions with a mean size of 10 nm to 20 μm in diameter occupy 5 to 49% of the surface area of the coating film can be produced by applying the nonelution type antifouling coating composition to a structure to be coated and forming a coating film. This coating film of a microheterogeneous structure is one of the characteristic features of the present invention.

In accordance with the present invention, the adhesion of marine organisms can be prevented by forming the above-mentioned coating film on top of the outermost layer of underwater portion of a marine structure to thereby render the seawater-contacting surface microheterogeneous in structure. The reasons why the particular effect of the present invention is produced are not yet fully clear but are presumably as follows.

First, a presumable physical reason is that since the coating film has granular or disk-like minute protrusions with a mean size of 10 nm to 20 μm in diameter, portions serving as footholds for marine organisms are lacking, hence marine organisms can hardly adhere thereto.

Secondly, presumable chemical and biological reasons are related to the mechanisms of adhesion of marine organisms. Marine organisms first recognize bases for their adhesion, then release an adhesive component onto the base surface and adhere thereto. According to a way of thinking, the base recognition and adhesion in such process of adhesion are made on the cellular level and whether the adhesion of marine organisms is easy or not is considered to be dependent on the process of foreign matter recognition by cells in the organisms. When the cells in organisms release an adhesive component onto the base surface, the adhesive component release is considered to be accompanied by changes in the state of assembly of cell membrane-constituting proteins and lipids and in the fluidity thereof and conduction of these changes as stimuli into cells is considered to induce activation such as change in form or intracellular substance release.

In cases where cells come into contact with the surface consisting of a single component base such as a functional group uniformly distributed on the surface, a high-density distribution of a cell membrane component capable of strongly interacting with said functional, group occurs on the contact surface between the base and cells and the foreign matter is recognized. On the other hand, in the case of a surface on which different functional groups are distributed uniformly, namely a coating film surface having a microheterogeneous structure, different cell membrane components gather according to the respective functional groups and therefore aggregate formation from the same membrane protein species can hardly occur over a wide range on the contact surface between the base and cells, hence the cell membrane remains approximately in a state of noncontact. Stimulus conduction into cells is thus inhibited and the foreign matter is not recognized by the cells. Such is considered to be the mechanism of the control of marine organism adhesion.

In accordance with the present invention, the coating film surface 5 to 49% of which is occupied by granular or disk-like minute protrusions with a mean size of 10 nm to 20 μm in diameter is identical to the above-mentioned surface on which different functional groups are distributed ununiformly. Therefore, it may be presumed that the adhesion of marine organisms can be controlled by the above mechanism.

The nonelution type antifouling method and nonelution type antifouling coating composition of the present invention, which respectively have the above-mentioned constitutions, can form, on a part or the whole part of structures, a coating capable of maintaining the antifouling effect for a prolonged period of time without eluting any component from the coating composition into seawater and therefore can suitably be applied to seawater-contacting surfaces such as cooling water systems in thermal power plants, nuclear power plants and so forth.

Furthermore, the method of forming a nonelution type antifouling coating according to the present invention can form a coating film having a microheterogeneous structure in which granular or disk-like minute protrusions formed in situ on the substrate with a mean size of 10 nm to 20 μm in diameter comprising at least one of said resins occupy 5 to 49% of the surface area of the coating film, only by applying the composition of the present invention to a structure to be coated without the neccesity of using granular or particulate component.

BEST MODE FOR CARRYING OUT THE INVENTION

The following examples are further illustrative of the present invention but are by no means limitative of the scope of the invention.

PRODUCTION EXAMPLE 1

Production of a Silicone-grafted Acrylic Resin

A polymerization vessel equipped with a stirrer and a temperature controller was charged with 35 weight parts of toluene and the contents were maintained at 105° C. A solution prepared in advance by mixing 23 weight parts of methyl methacrylate, 9 weight parts of 2-ethylhexyl acrylate, 18 weight parts of a silicone macromonomer having the formula (I) shown below and 0.7 weight part of benzoyl peroxide at room temperature was added dropwise to said polymerization vessel at a constant rate over 3 hours with stirring while the temperature was maintained at 105° C. After completion of the dropping, that temperature was further maintained for 30 minutes with stirring. Then, a mixture of 15 weight parts of toluene and 0.1 weight part of benzoyl peroxide was added dropwise at a constant rate over 30 minutes in the same manner. After completion of the dropping, that temperature was further maintained for 2 hours with stirring. The reaction mixture was then cooled to room temperature. The thus-obtained silicone-acrylic resin was a varnish with a toluene concentration of 50% and had a viscosity of 100 centipoises and a molecular weight of about 29,000. The SP value was 10.2 $[cal/cm^3]^{1/2}$ and the specific gravity was 1.15.

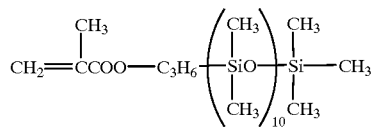

(I)

EXAMPLE 1

A test coating composition was produced by subjecting 94 weight parts (on the solid basis) of a room temperature-setting silicone resin (product of Shin-Etsu Chemical, KE45TS, SP value 9.2 $[cal/cm^3]^{1/2}$, specific gravity 1.04), 6 weight parts (on the solid basis) of the silicone-grafted acrylic resin prepared in Production Example 1 and 100 weight parts of toluene to dispersion treatment for coating production using a high-speed Homodisper apparatus. The difference in SP value between the reaction-setting resin and dry-setting resin used was 1.0 $[cal/cm^3]^{1/2}$ and the difference in specific gravity was 0.11.

EXAMPLE 2

A test coating composition was produced in the same manner as in Example 1 except that the room temperature-setting silicone resin (product of Shin-Etsu Chemical, KE45TS) was used in an amount of 90 weight parts (on the solid basis) and the silicone-grafted acrylic resin prepared in Production Example 1 in an amount of 10 weight parts (on the solid basis), together with 100 weight parts of toluene.

EXAMPLE 3

A test coating composition was produced in the same manner as in Example 1 except that the room temperature-setting silicone resin (product of Shin-Etsu Chemical, KE45TS) was used in an amount of 70 weight parts (on the solid basis) and the silicone-grafted acrylic resin prepared in Production Example 1 in an amount of 30 weight parts (on the solid basis), together with 100 weight parts of toluene.

COMPARATIVE EXAMPLE 1

A test coating composition was produced in the same manner as in Example 1 except that the room temperature-setting silicone resin (product of Shin-Etsu Chemical, KE45TS) was used in an amount of 98 weight parts (on the solid basis) and the silicone-grafted acrylic resin prepared in Production Example 1 in an amount of 2 weight parts (on the solid basis), together with 100 weight parts of toluene.

COMPARATIVE EXAMPLE 2

A test coating composition was produced in the same manner as in Example 1 except that the room temperature-setting silicone resin (product of Shin-Etsu Chemical, KE45TS) was used in an amount of 50 weight parts (on the solid basis) and the silicone-grafted acrylic resin prepared in Production Example 1 in an amount of 50 weight parts (on the solid basis), together with 100 weight parts of toluene.

Evaluation Results

1. Results of surface microstructure observation

Figure 2:
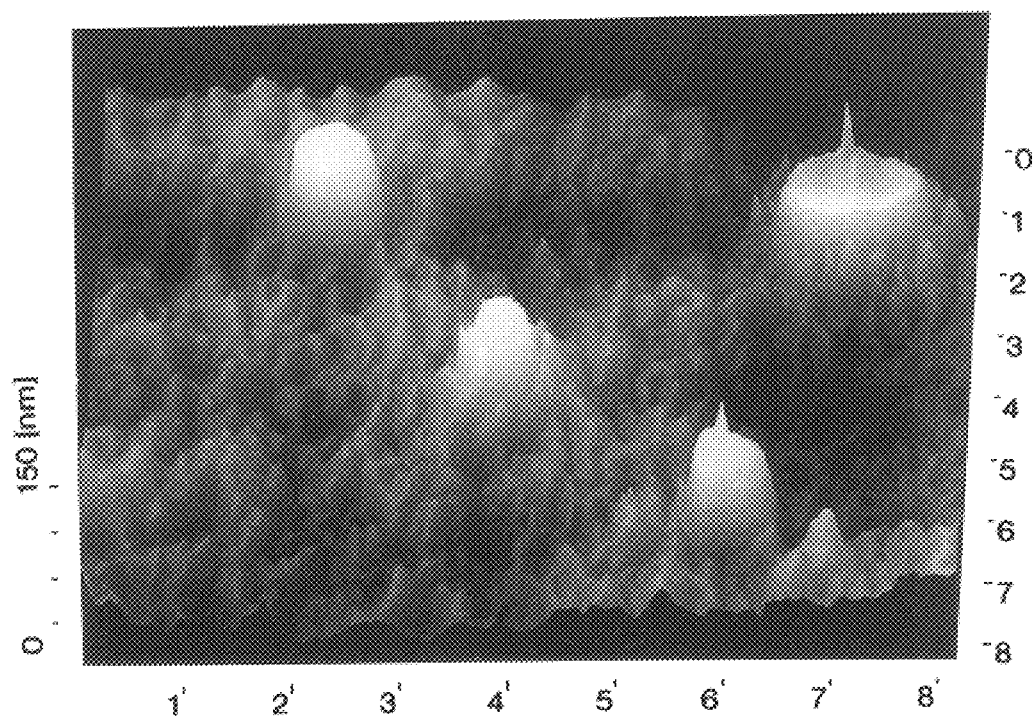
FIG. 2 is an interatomic force photomicrograph showing the coating surface obtained from the antifouling coating composition of Example 2.
Figure 3:
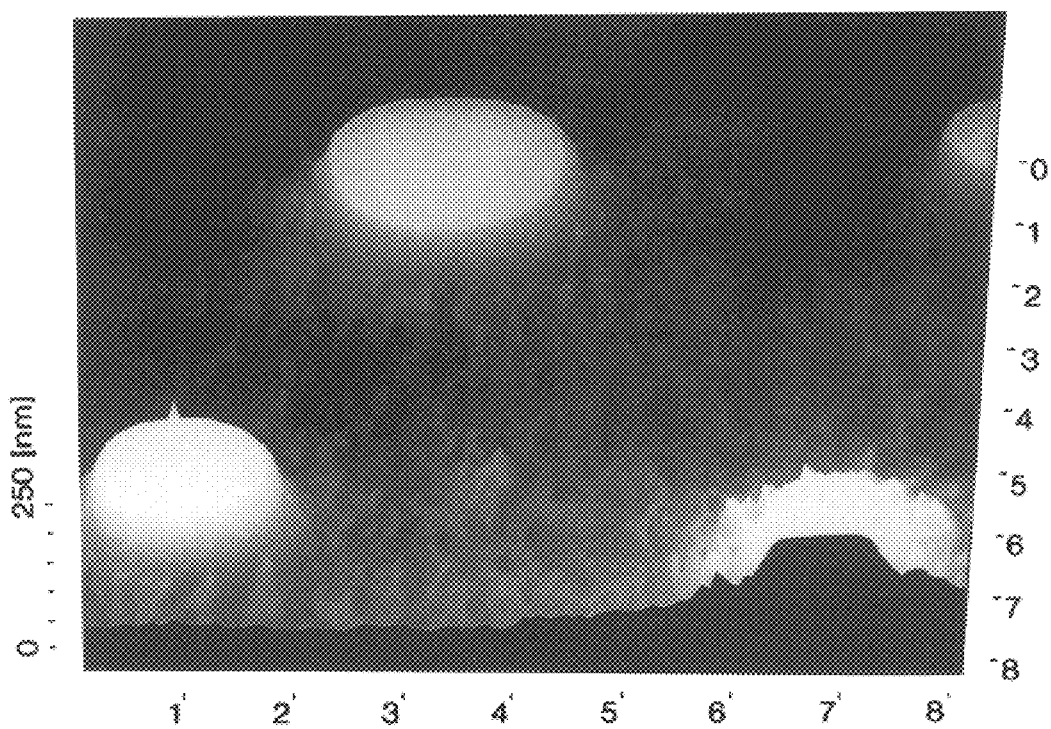
FIG. 3 is an interatomic force photomicrograph showing the coating surface obtained from the antifouling coating composition of Example 3.
Figure 4:
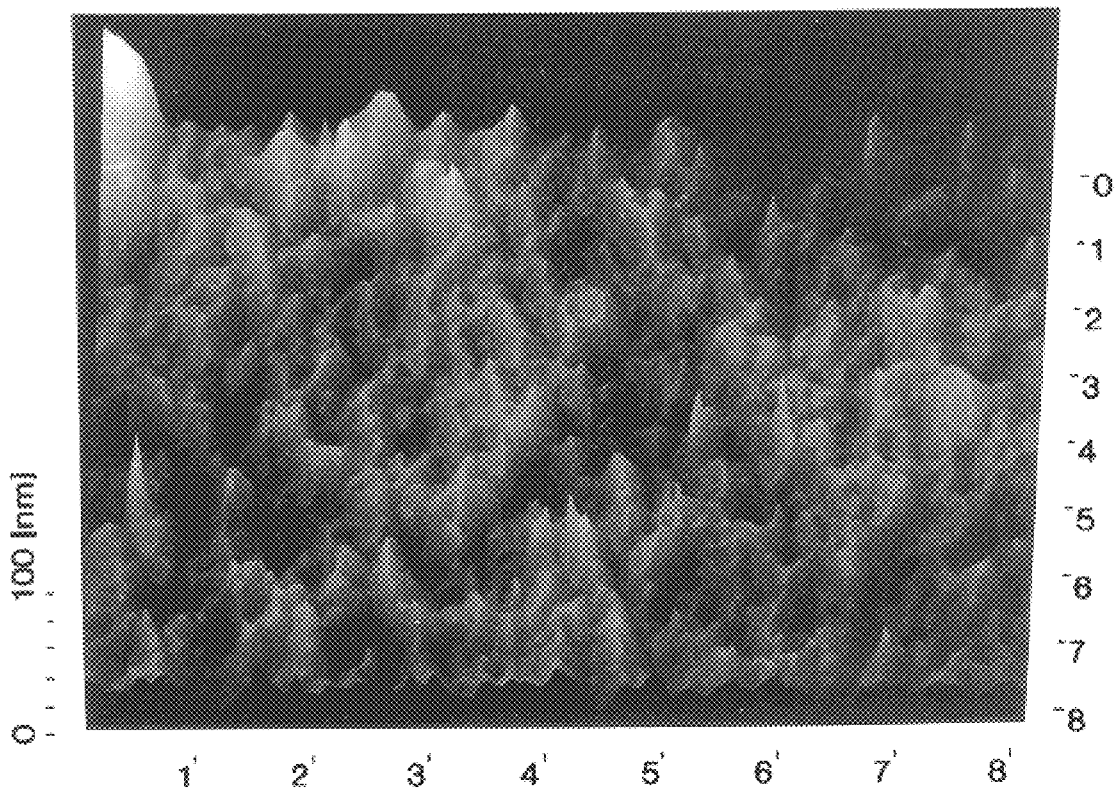
FIG. 4 is an interatomic force photomicrograph showing the coating surface obtained from the antifouling coating composition of Comparative Example 1.
Figure 5:
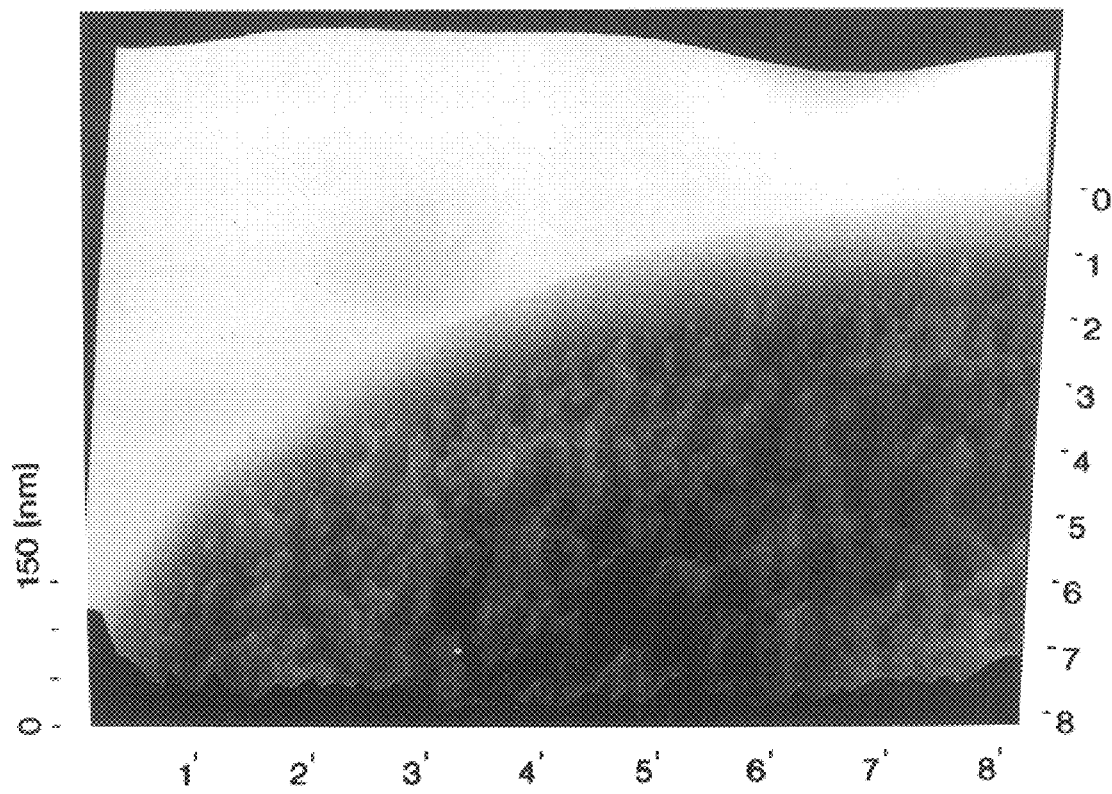
FIG. 5 is an interatomic force photomicrograph showing the coating surface obtained from the antifouling coating composition of Comparative Example 2.

The test coating compositions of Examples 1 to 3 and Comparative Examples 1 and 2 were respectively applied to glass plates (10 mm×10 mm×1 mm) each in an amount to give a dry film thickness of 100 μm. After drying at room temperature for a week, the surface microstructures were observed using an interatomic force microscope (SPI 3700, product of Seiko Instruments). The results are shown in FIG. 1 to FIG. 5.

2. Antifouling test results Rigid vinyl chloride resin sheets (300 mm×100 mm×2 mm) were respectively coated with the test coating compositions of Examples 1 to 3 and Comparative Examples 1 and 2 each in an amount to give a dry film thickness of about 100 μm and, after one week drying at room temperature, suspended into the sea at a depth of about 1 m from a marine raft off the coast of Tamano City, Okayama Prefecture, Japan, and checked for antifouling effect at timed intervals. The results are shown in Table 1.

TABLE 1

| | Antifouling effect evaluation results (% of area covered by adhering marine organisms) after immersion for | | | |
|---|---|---|---|---|
| | 1 month | 2 months | 3 months | 6 months |
| Example 1 | 0 | 0 | 0 | 0 |
| Example 2 | 0 | 0 | 0 | 0 |
| Example 3 | 0 | 0 | 0 | 5 |
| Comparative Example 1 | 0 | 5 | 10 | 50 |
| Comparative Example 2 | 5 | 10 | 30 | 70 |

What is claimed is:

1. A nonelution type antifouling method which comprises:
applying a nonelution type antifouling coating composition comprising at least two organic polymeric resins insoluble in seawater and incompatible with each other on top of the outermost layer of the underwater portion of a marine structure, the organic polymeric resins occurring in a form dissolved or suspended in a solvent; and
forming a coating film having a microheterogeneous structure comprising microdomains of dispersed phase and continuous phase, the microdomains of dispersed phase forming granular or disk-like minute protrusions with a mean diameter of 10 nm to 20 μm formed in situ on the substrate from at least one of the resins on 5 to 49% of the surface area of the coating film wherein the coating composition consists essentially of:
   i) a dry-setting silicone-grafted acrylic resin having a solubility parameter value of less than 12.5 $(cal/cm^3)^{1/2}$;
   ii) a one pack setting silicone rubber having a solubility parameter value of less than 12.5 $(cal/cm^3)^{1/2}$;
   the resins i) and ii) differing from each other in solubility parameter value by 0.3 to 4 $(cal/cm^3)^{1/2}$ and occurring in a form dissolved or suspended in a solvent and wherein the solubility parameter values are determined by using a solvent spectrum-constituting solvent.

2. The nonelution type antifouling method according to claim 1, wherein the minute protrusions occupy 5 to 35% of the surface area of the coating film.

3. The nonelution type antifouling method according to claim 1, wherein the coating film has a thickness of at least three times the mean diameter of the minute protrusions.

4. The nonelution type antifouling method according to claim 1, wherein the coating composition is hardened at ordinary temperature to thereby form the coating film.

5. The nonelution type antifouling method according to claim 1, wherein the resins i) and ii) are the same or different from each other in specific gravity by not more than 0.3.

6. The nonelution type antifouling method according to claim 1, wherein the resin i) is formed into the minute protrusions and the resin ii) is formed into continuous phase of the microheterogeneous structure.

7. The nonelution type antifouling method according to claim 6, wherein the marine structure is a member selected from the group consisting of ship bottom, fish farming net, stationary net, buoy and cooling water system in factories, thermal power plants or nuclear power plants.

8. The nonelution type antifouling method according to claim 1, wherein the resin i) is a silicone-grafted acrylic resin which is produced by using a silicone macromonomer having the formula (I).

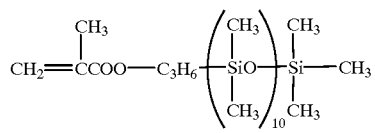

(I)

9. The nonelution type antifouling method according to claim 1, wherein the resin i) is incorporated in an amount of the lower limit of 3% by weight and less than 50% by weight.

10. A nonelution type antifouling coating composition for use in forming a nonelution type antifouling coating film having a microheterogeneous structure comprising microdomains of dispersed phase and continuous phase, the microdomains of dispersed phase forming a plurality of granular or disk-like minute protrusions with a mean diameter of 10 nm to 20 μm formed in situ on the substrate from at least one of the resins of the composition wherein said nonelution type antifouling coating composition consists essentially of:
   i) a dry-setting silicone-grafted acrylic resin insoluble in seawater and having a solubility parameter value of less than 12.5 $(cal/cm^3)^{1/2}$;
   ii) a one-pack setting silicone rubber having a solubility parameter value of less than 12.5 $(cal/cm^3)^{1/2}$;
   the resins i) and ii) differing from each other in solubility parameter value by 0.3 to 4 $(cal/cm^3)^{1/2}$ and occurring in a form dissolved or suspended in a solvent, and wherein the solubility parameter values are determined by using a solvent spectrum-constituting solvent.

11. The nonelution type antifouling coating composition according to claim 10, wherein the resins i) and ii) are the same or different from each other in specific gravity by not more than 0.3.

12. The nonelution type antifouling coating composition according to claim 10, wherein the resin i) is formed into the minute protrusions and the resin ii) is formed into continuous phase of the microheterogeneous structure.

13. The nonelution type antifouling coating composition according to claim 12, wherein the resin i) is incorporated in an amount of the lower limit of 3% by weight and less than 50% by weight.

14. The nonelution type antifouling coating composition according to claim 10, wherein the resin i) is a silicone-grafted acrylic resin which is produced by using a silicone macromonomer having the formula (I).

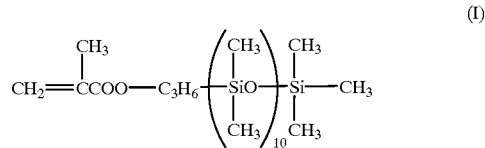

(I)

15. A method of forming a nonelution type antifouling coating having a microheterogeneous structure comprising microdomains of dispersed phase and continuous phase, the microdomains of dispersed phase forming granular or disk-like minute protrusions with a mean diameter of 10 nm to 20 μm formed on the surface of the coating, which comprises:
   applying to a structure a nonelution type antifouling coating composition which consists essentially of:
      i) a dry-setting silicone-grafted acrylic resin having a solubility parameter value of less than 12.5 $(cal/cm^3)^{1/2}$;
      ii) a one-pack setting silicone rubber having a solubility parameter value of less than 12.5 $(cal/cm^3)^{1/2}$;
   the resins i) and ii) differing from each other in solubility parameter value by 0.3 to 4 $(cal/cm^3)^{1/2}$ and occurring in a form dissolved or suspended in a solvent; on a structure to be coated; and
   drying the coating composition to thereby form the nonelution type antifouling coating,
   and wherein the solubility parameter values are determined by using a solvent spectrum-constituting solvent.

16. The method of forming a nonelution type antifouling coating according to claim 15, wherein, after applying the coating composition, drying at room temperature to thereby harden the resins i) and ii) to form the coating.

17. The method of forming a nonelution type antifouling coating according to claim 16, wherein resin i) is incorporated in an amount of the lower limit of 3% by weight and less than 50% by weight, and the microdomains of dispersed phase forming granular or disk-like minute protrusions with a mean diameter of 10 nm to 20 μm occupy 5 to 49% of the surface area of the coating film.

18. A coating formed by the method according to claim 15.

19. The coating according to claim 18, wherein the minute protrusions occupy 5 to 35% of the surface area of the coating film.

20. The method of forming a nonelution type antifouling coating according to claim 15, wherein the resin i) a silicone-grafted acrylic resin is produced by using a silicon macromonomer having the formula ((I).

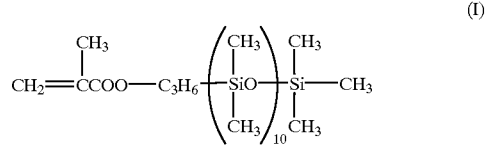

(I)

* * * * *

UNITED STATES PATENT AND TRADEMARK OFFICE
CERTIFICATE OF CORRECTION

PATENT NO. : 6,214,902 B1
DATED : April 10, 2001
INVENTOR(S) : Naoki Yamamori et al.

It is certified that error appears in the above-identified patent and that said Letters Patent is hereby corrected as shown below:

<u>Title page,</u>
Item [30] Foreign Application Priority Data should read:

-- Aug. 26, 1996 (JP) 8-244253 --

Signed and Sealed this

Sixteenth Day of October, 2001

Attest:

*Attesting Officer*

NICHOLAS P. GODICI
*Acting Director of the United States Patent and Trademark Office*